United States Patent Office.

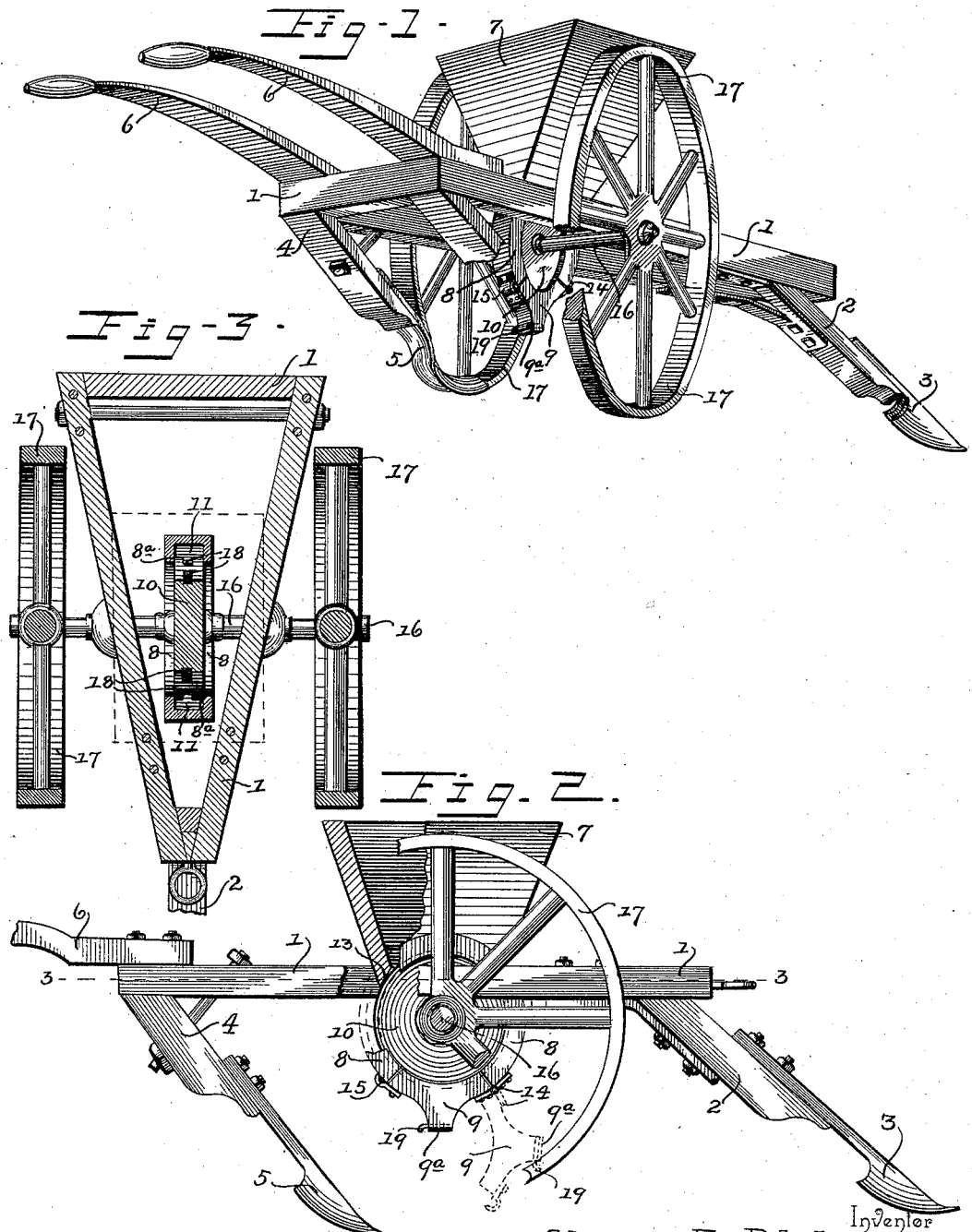

ALONZO E. BLAKE, OF WILMINGTON, NORTH CAROLINA.

SEED-PLANTER.

SPECIFICATION forming part of Letters Patent No. 604,017, dated May 17, 1898.

Application filed July 28, 1897. Serial No. 646,193. (No model.)

*To all whom it may concern:*

Be it known that I, ALONZO E. BLAKE, a citizen of the United States, residing at Wilmington, in the county of New Hanover and State of North Carolina, have invented a new and useful Seed-Planter, of which the following is a specification.

My invention relates to improvements in seed-planters especially adapted for dropping peas, corn, and peanuts; and the object that I have in view is to provide a simple construction and arrangement of parts by which the contents of the machine-hopper may be deposited automatically in the ground and at regular distances apart.

A further object of my invention is to provide an improved dropping mechanism with means which may be adjusted to regulate the distance between the points where the seed may be deposited; and a further object is to provide means whereby the parts may be adjusted to permit of ready access to the interior operative elements of the machine for removing any lodgment, &c.

To the accomplishment of these ends my invention consists in a hopper having a flanged divided bearing-ring forming an annular seed-conduit and a movable spout fitted in the divided part of the flanged divided ring and serving to complete the circular part of the same, said spout being hinged at one end to said divided ring and adapted to be locked detachably in place to the other end of said divided ring, in combination with a suitable framework, an axle, a dropping-disk fitted to travel in the bearing-ring and spout and attached to the axle to rotate therewith, and suitable carrying or ground wheels mounted on the axle; and the invention further consists in the construction and combination of parts which will be hereinafter fully described and claimed.

To enable others to understand my invention, I have illustrated the preferred embodiment thereof in the accompanying drawings, forming a part of this specification, and in which—

Figure 1 is a perspective view of a planter constructed in accordance with my invention. Fig. 2 is a view partly in side elevation and broken away to show certain parts in section. Fig. 3 is a horizontal sectional view on the plane indicated by the dotted line 3 3 of Fig. 2.

Like numerals of reference denote corresponding parts in all the figures of the drawings, referring to which—

1 designates a suitable framework forming part of my planter. The implement is shown in the accompanying drawings as provided with a front stock 2, carrying the furrow-opening shovel 3, and with the rear stocks 4, provided with the covering-shovels 5; but these devices may be of any suitable construction and arrangement, as no novelty is claimed therefor in this application. To the frame 1 of the implement is attached the handles 6, by which the operator is enabled to guide and control the implement.

The side bars of the frame 1 are preferably inclined or converged from their front ends toward their rear ends, and upon these bars of the frame is mounted the hopper 7, the latter being attached to the frame in any suitable or preferable manner. This hopper is of novel construction to form a bearing or conducting ring 8, which is made as an integral part of the hopper or is attached rigidly thereto. The upper part of the hopper or the hopper proper has inclined walls, by which the seed therein is conducted toward the medial line of the machine and toward the conducting or bearing ring 8. This conducting or bearing ring is arranged in central relation to the hopper, of which it forms a part, and said ring is divided or cut away at the lower part thereof to accommodate the chute 9, which is arranged between the terminals of the conducting-ring in a manner to complete the circle of the conducting-ring. This conducting or bearing ring is flanged at its sides, as at $8^a$, to embrace the sides of the dropping-disk 10, and said dropping-disk is arranged to fit snugly between the flanged sides of the conducting-ring, but it is of such diameter that a space is left between the periphery of the disk and the inner face of the conducting-ring, as shown by Fig. 3. The segmental space between the conducting-ring and the peripheral edge of the dropping-disk is indicated at 11 in the drawings, and said space opens into or communicates with the chamber of the hopper to provide for the free passage of the contents of the hopper into the conduit or space 11 of the bearing or conducting ring. At the terminals of the conducting-ring, where it is divided, the seed conduit or space 11 is closed by the abutments or chocks 13 to arrest the descent of the contents of the conduit or space 11 in the conducting-ring. The chute 9 is of segmental form at its upper part to properly fit the opening or space between the terminals of the divided conducting-ring, and said spout or chute has a depending extension 9ª, through which the seed may be dropped into the ground. This chute 9 is hinged or pivoted at one corner to one of the terminals of the divided conducting-ring, as at 14, and the other corner or end of the chute is fastened detachably to the other terminal of the divided conducting-ring by any suitable style of fastener, one of which is indicated at 15 in the drawings. This spout or chute 9 may be opened to expose the lower edge of the dropping-disk 10, and thus the contents of the chute may be removed by hand, and access may be had to the dropping-disk for the purpose of cleaning the same and the interior of the machine from any substance which may lodge therein.

In suitable bearings on the carrying-frame 1 of the machine is journaled an axle 16, which extends across the machine and through the hopper, and to this axle is rigidly attached the dropping-disk 10, the disk being fastened in place in any suitable way to the axle. On the protruding ends of the axle are mounted the carrying or ground wheels 17, and said wheels serve to sustain the frame, the hopper, and the spout or chute 9 in the proper elevated positions, the chute 9 being held the proper distance above the open furrow to deposit the seed therein.

The dropping-disk 10 consists of a single piece, preferably, although it may be made in sections, if desired. In the peripheral edge of this disk 10 is a series of pockets or openings 18, which are spaced at suitable intervals from each other around the periphery of the disk, and these pockets or openings 18 serve the purposes of seed-cups in carrying the seed from the hopper or the annular seed-conduit and depositing the same in the chute 9. It is evident that the alternate pockets or openings 18 in the dropping-disk may be closed by plugs or other suitable closures to plant the seed at greater distances from each other, or the openings may all be employed to plant the seed closer together.

The chute 9 is provided with a regulating-slide 19, which is attached to the spout in a suitable way to enable it to be moved across the mouth of the chute or spout to vary the area of the opening therein, thus regulating to a certain extent the quantity of seed which may be planted.

The operation may be described briefly as follows: The seed is deposited in the hopper and flows into the annular channel until it is arrested by the abutments or chocks at the terminals of the divided conducting-ring. When the machine is drawn across the field, the ground-wheels turn the axle and the dropping-disk, and the seed contained in the pockets or cups of the dropping-disk is deposited into the chute 9, by which the seed is placed in the furrow opened by the front shovel, the dirt being thrown upon the seed and the furrow closed by the rear shovels. The distance of the hills may be regulated by employing more or less of the pockets in the dropping-disk, and the quantity of seed deposited may be regulated by adjusting the slide. The slide is also useful in that it may be adjusted to close the chute when traveling to or from the field. The chute may be thrown down and opened, as indicated by dotted lines in Fig. 2, to permit access to the interior of the machine.

Various changes in the form and proportion of parts may be made without departing from the spirit or sacrificing the advantages of my invention.

My improved seed-planter may be used in planting any kind of seed or for distributing fertilizer by employing the various kinds of dropping-disks suitable for dropping the seed or fertilizer. This contemplates the employment of interchangeable dropping-disks, each disk being constructed or adapted for planting a certain kind of seed; but one or more of the disks may be so constructed as to enable the same to be used in planting more than one kind of seed.

In lieu of constructing the dropping-disk with closures for the pockets or recesses therein, as hereinbefore described, I may use interchangeable disks in which the pockets are spaced apart the proper distances.

Having thus fully described my invention, what I claim as new, and desire to secure by Letters Patent, is—

1. In a seed-planter, the divided annular conducting-ring provided at its terminals with suitable abutments and with the radial spaced flanges forming between themselves a seed-conducting space, a pendent delivery-spout occupying the space between the terminals of the divided ring and hinged at one edge to one terminal of the ring, and a fastener to detachably connect the other side of the spout to the other terminal of said conducting-ring, combined with a shaft which passes through the ring, and a dropping-disk arranged on the shaft to have its peripheral edge work in the annular space of the ring and the chute and to be embraced laterally by the flanges of said ring, substantially as described.

2. In a planter, a hopper having, as an integral part thereof, an annular, divided, conducting-ring closed at its terminals by suitable abutments and provided with flanges at the sides thereof, and an adjustable chute occupying the space between the terminals of said divided conducting-ring, combined with a dropping-disk fitted to rotate between the flanged conducting-ring and within the chute, substantially as and for the purposes described.

3. In a planter, the combination with a frame, an axle, and ground-wheels, of a dropping-disk carried by the axle and provided with pockets or cups, a hopper having, as a part thereof, a divided conducting-ring which circumferentially incloses the dropping-disk and is flanged to embrace the faces of said dropping-disk, and a hinged chute occupying the space between the terminals of said divided ring and detachably attached to one of the terminals of said conducting-ring, for the purposes described, substantially as set forth.

In testimony that I claim the foregoing as my own I have hereto affixed my signature in the presence of two witnesses.

ALONZO E. BLAKE.

Witnesses:
STUART HEINSBERGER,
S. M. BOATWRIGHT.